United States Patent
Carpenter

(10) Patent No.: US 7,047,349 B2
(45) Date of Patent: May 16, 2006

(54) MULTI-REDUNDANT INLAID WIRING HARNESS

(75) Inventor: Billy R. Carpenter, Springtown, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 668 days.

(21) Appl. No.: 09/826,238

(22) Filed: Apr. 4, 2001

(65) Prior Publication Data
US 2002/0153159 A1 Oct. 24, 2002

(51) Int. Cl.
G06F 13/00 (2006.01)

(52) U.S. Cl. ............... 710/316; 139/420 R; 714/4; 174/117 F; 361/827

(58) Field of Classification Search ............. 710/316, 710/317, 100, 113–115; 139/420 R; 709/201, 709/203, 238–241; 174/113 R, 114 R, 117 F, 174/69–72 TR; 361/760, 748, 728, 736, 361/826, 827; 714/4
See application file for complete search history.

(56) References Cited

U.S. PATENT DOCUMENTS

| 4,537,469 A * | 8/1985 | Kircher ............... 385/13 |
| 5,397,891 A | 3/1995 | Udd et al. |
| 5,524,679 A * | 6/1996 | Wiener ............... 139/420 R |
| 5,530,813 A * | 6/1996 | Paulsen et al. ............. 710/317 |
| 5,809,220 A * | 9/1998 | Morrison et al. ............. 714/12 |
| 6,467,003 B1 * | 10/2002 | Doerenberg et al. ........ 710/117 |
| 6,618,777 B1 * | 9/2003 | Greenfield ............... 710/120 |
| 2002/0078138 A1 * | 6/2002 | Huang et al. ............. 709/203 |
| 2004/0221087 A1 * | 11/2004 | Benedetto et al. ......... 710/316 |

FOREIGN PATENT DOCUMENTS

| EP | 0506298 A2 | 9/1992 |
| EP | 0665457 A2 | 8/1995 |

OTHER PUBLICATIONS

*How About This? Avionics Would Go In Plane's Skin*, Electronics, vol. 60, No. 21, Oct. 15, 1987.

* cited by examiner

Primary Examiner—Rehana Perveen
Assistant Examiner—Clifford Knoll
(74) Attorney, Agent, or Firm—Bracewell & Giuliani LLP

(57) ABSTRACT

A multi-redundant inlaid wiring harness provides for alternate electrical or optical pathways in an aircraft wiring system. A plurality of conduits are inlaid between layers of composite fabric during fabrication of a section of an aircraft. The conduits are connected at their ends to computer-controlled gateway buses. The buses select a pathway between the buses from the number of possible pathways. If the selected pathway is later damaged, the buses select a new pathway and reroute the power or signal over the new pathway. Conduit selection is based on any of several hierarchies including path of least resistance and shortest or fastest path.

20 Claims, 2 Drawing Sheets

MULTI-REDUNDANT INLAID WIRING HARNESS

BACKGROUND OF THE INVENTION

1. Field of the Invention

This invention generally relates to electrical system wiring in aircraft and particularly relates to redundant wiring systems inlaid in a composite body.

2. Description of the Prior Art

Electrical power connections in aircraft are typically accomplished using wiring networks made from a conductive material such as metal, whereas control signals may be transmitted using metal wires or optical fibers. Many wires are bundled together in a harness for ease of installation and replacement and to facilitate protection of the wires. The harnesses are located within the interior of the aircraft and may have a single, multiple wire connector at either or both ends, or wires can be separated from the harness as needed along the length of the harness.

Composite materials are being used to construct sections of aircraft, though their use has generally been limited to wing surfaces and exterior panels. Methods of constructing entire aircraft of composites have been proposed, but would involve normal aircraft manufacturing techniques after construction of the main body sections, including running wiring harnesses throughout the interior of the aircraft to provide the necessary power and signal connections. In the past, the wiring harness assemblies are installed in the aircraft after the aircraft body has been assembled. They are typically run in the infrastructure of the aircraft. Such an assembly can cause problems during installation, being subjected to possible shorts generated during installation, and can result in problems after installation because of exposure to wear and tear.

SUMMARY OF THE INVENTION

A multi-redundant inlaid wiring harness provides for alternate electrical or optical pathways in an aircraft wiring system. A plurality or network of wires is inlaid between layers of composite fabric during fabrication of a section of an aircraft. The wires are connected at their ends to computer-controlled buses. The buses select a pathway between the buses from the number of possible pathways. If the selected pathway is later damaged, the buses select a new pathway and reroute the power or signal over the new pathway. Specifically, it is an important feature of the subject invention that the inlaid wiring network is embedded in the composite fabrication layers of the aircraft, minimizing the likelihood of shorted wiring during installation and later due to wear and tear. In addition, the controlled selection and redundancy of the wiring system improves reliability and permits on-the-fly diagnostics and correction of any faults due to a wiring failure.

The wiring system of the subject invention provides multiple pathways for the conveyance of electrical signals throughout the wiring network of the aircraft by providing required information at an entrance gateway to a conduit system, transmitting the information through the conduit system to a exit gateway and then directing the information to its destination. The system relies on the fact that as long as the information is properly entered and exited, the pathway for conveyance is unimportant. This permits any of multiple pathways to be selected and provides for built-in redundancy in the event of failure. By way of example, if certain information is required at the exit gateway and cannot be located, the first analysis would be to determine that the information was, in fact, present at the entrance gateway. Once this assurance is given, then the system will identify an available, functional path to deliver the required information to the exit gateway. This not only permits redundancy not before available in aircraft wiring systems but also simplifies the overall wiring process by tying information to its use requirements rather than to the conduits for delivering the information.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
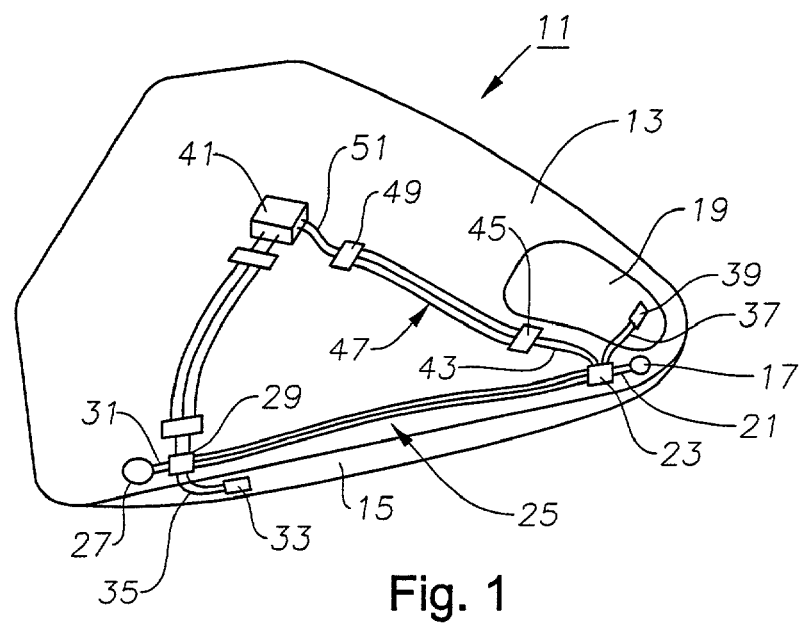
FIG. 1 is a perspective view of an aircraft constructed in accordance with the present invention.

Referring to FIG. 1, aircraft 11 is a vehicle having a structure formed from layers of composite materials. Aircraft 11 is shown as a body having integrated wings and preferably being formed from a one-piece upper section 13 and a one-piece lower section 15. However, the present invention may be applied to wing sections or other vehicles and structures, including those of boats or automobiles. A cockpit controller 17 (see FIG. 2) is located in a cockpit 19 and may be a manual or automated input device for a pilot, such as a switch or a flight-control stick, or computer-controlled, such as in a fly-by-wire system or an autopilot system. Cockpit controller 17 may be an electrical controller or an optical controller. Cockpit controller 17 is connected by input wires 21 to a cockpit bus or gateway 23, cockpit bus 23 having a plurality of connectors for attaching wires 25. The terms "wire" and "wires" are used herein to denote a conduit for power or a signal, and these conduits may be, for example, electrical wire or optical fiber. Cockpit bus 23 is a selector bus for selecting which conduit wires 25 are connected to input wires 21.

Wires 25 are embedded between the layers of sections 13, 15 during fabrication of sections 13, 15. A large number of wires 25 are laid throughout sections 13, 15, though only a few wires 25 are shown in FIG. 1. The important aspect of the system is that a large network of conduit wires 25 are placed in the system during fabrication without specific regard to the use of each conduit wire. However, the number of conduit wires 25 embedded in sections 13, 15 may be limited by considerations such as surface strength and aircraft weight. The conduit wires 25 have terminal ends extending through the outer surface of aircraft 11 toward a wing component 27 that requires electrical power or a control signal, such as a wing-mounted marker light or an electrical servo for moving a flight-control surface. Wires 25 are connected to a wing bus 29 or exit gate, also a selector bus, located near wing component 27. Wing bus 29 is connected to wing component 27 by output wires 31. Bus gateways 23, 29 select a pathway among wires 25 between buses 23, 29 for connecting cockpit controller 17 to wing component 27. Because aircraft 11 is made from composites materials, there is no provision for a common ground throughout aircraft 11, and each power pathway must be accompanied by a path to ground. Typically, one of the available conduit wires will be designated as a common ground path.

A wing controller 33 is mounted in the wing and may be, for example, a position sensor or an accelerometer. Wing controller 33 may be an electrical or an optical controller. Wing controller 33 is connected by input wires 35 to wing bus 29, which is connected to cockpit bus through wires 25. Output wires 37 connect cockpit bus 23 to a cockpit component 39, for example, a read-out instrument or autopilot computer.

Cockpit bus 23 and wing bus 29 are each connected to a central wiring server such as the computer 41. Bus data wires 43 connect each bus 23, 29 to an outer bus 45 located near each bus 23, 29, the outer buses 45 being connected by data wires 47 to computer buses 49. Each computer bus 49 is connected by computer data wires 51 to wiring computer 41. Buses 45, 49 are selector buses for selecting pathways from among data wires 47 to connect computer 41 to buses 23, 29.

Figure 2:
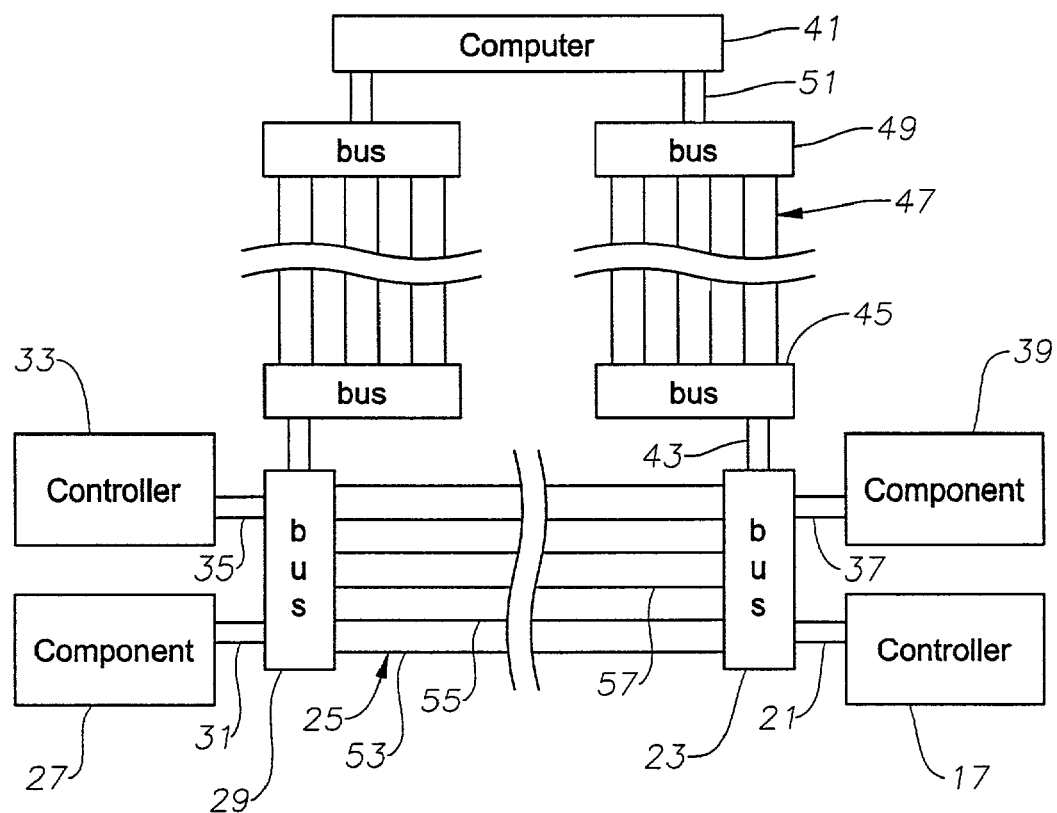
FIG. 2 is a schematic view of the wiring harness and buses of FIG. 1.

FIG. 2 schematically shows the multi-redundant wiring system of FIG. 1. In this figure, cockpit controller 17, wing controller 33, cockpit component 39, and wing component 27 are electrical devices. Cockpit controller 17 is connected by input wires 21 to cockpit bus 23, and wing bus 29 is connected by output wires 31 to wing component 27. Wires 25 extend from cockpit bus 23 to wing bus 29. Wires 25 comprise a large number of wires between buses 23, 29, but only a few are shown in FIG. 2. Wing controller 33 is connected by input wires 35 to wing bus 29, and output wires 37 connect cockpit bus 23 to cockpit component 39. Input wires 21, 35 and output wires 31, 37 each comprises a power wire and a ground wire. Bus data wires 43 connect buses 23, 29 to outer buses 45, and data wires 47 connect each outer bus 45 to a computer bus 49. Computer data wires 51 connect each computer bus 49 to wiring computer 41.

Wiring computer 41 determines the condition and usage of each conduit wire 25, 47 and instructs buses 23, 29, 45, 49 to select particular wires 25, 47 for carrying power or a signal between buses 23, 29 and between buses 45, 49. Buses 45, 49 select pathways to connect computer 41 to buses 23, 29, whereas buses 23, 29 select pathways to connect controllers 17, 33 to components 27, 39. Wiring computer 41 may select the shortest route or the route with the least resistance between buses 23, 29 and between buses 45, 49. However, if a pathway becomes unusable because of damage to aircraft 11 or is needed for a higher-priority use, buses 23, 29, 45, 49 are instructed by computer 41 to reroute the power or signal to another wire 25, 47 to complete the circuit. This multi-redundancy allows for buses 23, 29, 45, 49 to maintain a connection between the buses 23, 29, 45, 49, maintaining the connections between computer 41 and buses 23, 29 and between controllers 17, 33 and components 27, 39.

The following description of the operation of the wiring system of the present invention will focus on the connections and control of the connections between cockpit controller 17 and wing component 27. The operation of the wiring system in connecting wing controller 33 and cockpit component 39 will be the same as that described below, but the direction of the signal through wires 25 would be reversed.

Buses 23, 29 are controlled by wiring computer 41 for switching the connection between buses 23, 29 from one of the wires 25 to another of the wires 25 connected to buses 23, 29. Only one of the wires 25 is a live power connection from cockpit controller 17 to wing component 27 at any time. However, there are a number of redundant wires 25 leading to wing component 27, 11 and buses 23, 29 can switch the connection to an alternate wire. Wiring computer 41 determines the condition and usage of each data wire between outer buses 45 and computer buses 49, and instructs buses 45, 49 to select a particular data cable for transmitting data to buses 23, 29. The data is carried across computer data wires 51 to computer bus 49. The data is routed into the selected wire 47 and arrives at outer bus 45. The data moves from bus 45 to cockpit bus 23 through bus data wires 43. The same type of data connections also provide data for wing bus 29, though separate buses 45, 49 are used. Buses 23, 29 select the appropriate pathway, for example, wire 53, for transmitting power from cockpit controller 17 to wing component 27 and select a ground wire, for example, wire 55.

A pilot or computer actuates cockpit controller 17, and power travels through one input wire 21 to cockpit bus 23, along wire 53, and through wing bus 29 and one output wire 31 to wing component 27. The other output wire 31 provides a path to close the circuit by connecting to the other input wire 21 via buses 23, 29 and wire 55. If wiring computer 41 determines that wire 53 or wire 55 is damaged or otherwise unusable, computer 41 will instruct buses 23, 29 to shift the power or grounding functions to an alternate wire, for example, wire 57. If a data wire 47 is damaged, computer 41 will cause buses 45, 49 to select an alternate data wire 47.

Figure 3:
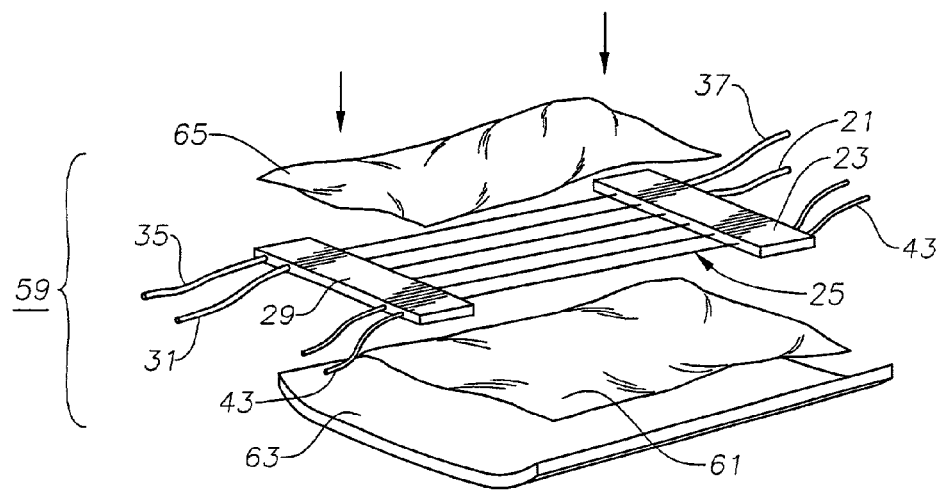
FIG. 3 is an exploded perspective view of a section of the aircraft of FIG. 1.
Figure 4:
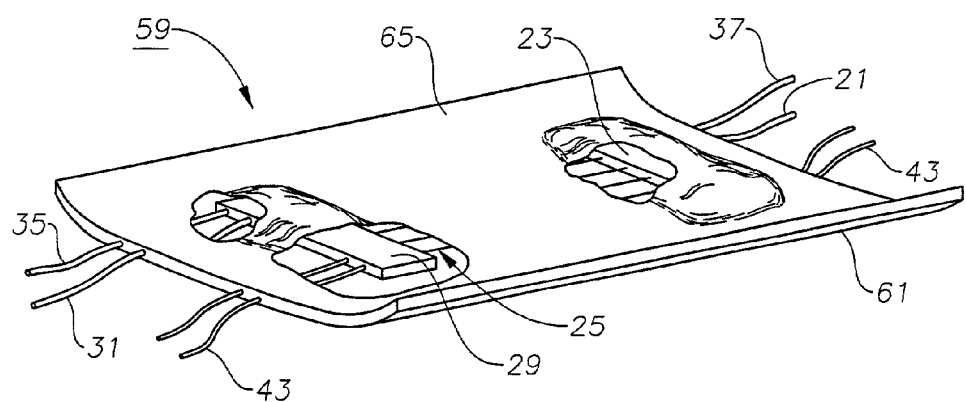
FIG. 4 is perspective view of the section of FIG. 3.

FIG. 3 shows the components used in creating a small surface 59 made from composites and having inlaid wires 25. Outer layers 61 of fabric are placed in a negative mold 63 to form the outside of surface 59. The fabric is preferably woven, high-strength fibers, such as aramid or carbon fiber. Layers 61 could also be unidirectional or chopped fibers. Layers 61 are preferably pre-impregnated with a resin, but resin may be applied through other processes. Wires 25 are laid on top of outer layers 61 in the desired orientation. Because wires 25 are inlaid, it is required that there be a sufficient number of wires 25 and that wires 25 be placed in the proper locations. Wires 25, input wires 21, output wires 31, and data wires 43 are connected to cockpit bus 23 and wing bus 29. Inner layers 65 of fabric are applied over wires 25 and buses 23, 29, enclosing them in the thickness of surface 59. Inner layers 65 contact outer layers 61 and affix wires 21, 25, 31 and buses 23, 29 in their positions on outer layers 61, there being no space between the components after curing. Though not shown, this process can be repeated to create several layers of wires 25 with layers 65 of fabric between the layers of wires 25. Wires 21, 31 may be directed out of layers 65 for connection to a wing component 27 (FIG. 1) or cockpit controller 17 (FIG. 1), though wires may remain embedded for some distance, as shown in FIG. 4. Alternatively, the ends of wires 25 may be directed through layers 65 of fabric to allow for connection of external buses 23, 29 to wires 25. Also, though not shown, wires 25 may terminate in connectors under layers 65 to which external buses 23, 29 are connected after removing material from layers 65 to expose the connectors. A completed surface 59 containing inlaid wires 25 and buses 23, 29 is shown in FIG. 4.

In assembly, a negative mold 63 is prepared and receives outer layers 61 of fabric that form the outer surface of the finished part, as shown in FIG. 3. Wires 25 and buses 23, 29 are laid in a desired orientation on outer layers 63, and inner layers 65 of fabric are laid in mold 63 over wires 25 and buses 23, 29. Wires 21, 31 for connecting buses 23, 29 to a cockpit controller 17 (FIG. 1) or wing component 27 (FIG. 1) are directed through and out of inner layers 65. Data wires 43 extend out of inner layers 65 to connect buses 23, 29 to wiring computer 41.

Referring to FIGS. 1 and 2, in operation, a computer or pilot actuates a controller 17, 33 to send a signal or electrical power to a component 27, 39. The power or signal passes down input wires 21, 35 to a selector bus 23, 29 and is carried to and from a component 27, 39 through pathways selected from a plurality of wires 25 connected to a second selector bus 23, 29. Buses 23, 29 are preferably controlled by a wiring computer 41 that determines the best pathway from among the plurality of wires 25 for connecting buses 23, 29, computer 41 instructing buses 23, 29 to select particular wires 25. Data from wiring computer 41 is carried to buses 23, 29 by a system of data buses 45, 49, also selector buses, and a plurality of data wires 47. Wiring computer 41 chooses a pathway for the data to reach buses 23, 29 from the data wires 47. If a problem develops in the chosen power or data pathways, buses 23, 29 or 45, 49 are instructed to select a different, undamaged pathway, thus maintaining a closed circuit between controllers 17, 33 and components 27, 39 or computer 41 and buses 23, 29.

The present invention allows for a wiring system of an aircraft to bypass damage caused by material failure or by, for example, projectiles piercing the structure of the aircraft. By automating the process of selecting one of a plurality of pathways to complete a circuit, the pilot is not required to act or be immediately aware that the damage has occurred. The advantage is a system that may prevent a failure causing loss of the aircraft and/or pilot.

While the invention has been shown in only one of its forms, it is not thus limited but is susceptible to various changes and modifications without departing from the spirit thereof. For example, though shown as being controlled by wring computer 41, buses 23, 29 may be semi-autonomous, acting only in pairs to determine the appropriate pathway. Buses 23, 29 may have on-board computers and operational logic for functioning alone or when wiring computer 41 fails or data wires 43, 47, 51 are damaged. A system may be used in which only one bus 23, 29 is a selector bus, the second bus being a non-selector bus in which all wires 25 are connected to wires 21, 31.

An interconnected wire grid would have connections to many buses, allowing a controller to connect to a component through a series of indirect paths. With such a grid, it is also possible to use unused wires for antennae by connecting the wires to transmission sources.

I claim:

1. A wiring network for a structure having a composite fabrication assembly made of a plurality of layers of composite materials for connecting components outside of the structure for sending and receiving transmittable information between the components, the wiring network comprising:
   a plurality of nonwoven conductive conduits placed between layers of the assembly, each having opposite ends;
   a first and a second gateway connected to opposite ends of each conduit and positioned to select one of the conduits for communication between the gateways; and
   means for controlling selecting one of the conduits from the plurality of nonwoven conductive conduits responsive to failure of a previously selected one of the plurality of conductive conduits to direct transmittable information over the selected conduit to thereby provide continued communication between the first and the second gateway.

2. The wiring network of claim 1, wherein the first gateway is connected to a first controller and a first component, wherein the second gateway is connected to a second controller and a second component, wherein the plurality of nonwoven conductive conduits is a first and a second plurality of conductive conduits, wherein the first plurality of conductive conduits provides communication between the first controller and the second component and the second plurality of conductive conduits provides communication between the second controller and the first component, and wherein the means for controlling selecting one of the conduits from the plurality of conductive conduits includes means for controlling selecting a first one of the conduits from the first plurality of conductive conduits responsive to failure of a previously selected one of the first plurality of conductive conduits to direct transmittable information over the first selected conduit and means for controlling selecting a second one of the conduits from the second plurality of conductive conduits responsive to failure of a previously selected one of the second plurality of conductive conduits to direct transmittable information over the second selected conduit to thereby provide multiple component specific continued communication between the gateways.

3. The wiring network of claim 1, wherein the first gateway is a computer-controlled selector bus, wherein the plurality of nonwoven conductive conduits is a first plurality of nonwoven conductive conduits, wherein the means for controlling selecting includes a wiring computer, and wherein the wiring network further comprises:
   a second plurality of nonwoven conductive conduits placed between the layers of the assembly, each having opposite ends;
   a third and a fourth gateway connected to opposite ends of each of the second plurality of conduits, the third gateway a computer-controlled selector bus connected to the wiring computer and positioned to select one of the conduits of the second plurality of conduits for direct communication between the third, fourth, and first gateways; and wherein
   the wiring computer controls selecting one of the conduits of the second plurality of conduits positioned between the third and the fourth gateways to maintain control of the first gateway.

4. The wiring network of claim 1, wherein the layers of the assembly are separate fabric layers made of woven, high-strength fibers, impregnated with resin.

5. The wiring network of claim 1, wherein each of said gateways is a selector bus positioned to select one of the conduits from the plurality of nonwoven conductive conduits to receive information from an end component conduit connected to the respective selector bus.

6. The wiring network of claim 1, wherein each gateway is placed between the layers of the assembly with the respective conduit end attached to the gateway within the layers of the assembly, the gateway further including a terminal for connecting a component to the gateway externally of the layers of the assembly.

7. The wiring network of claim 1, wherein said means for controlling selecting includes a programmable server.

8. The wiring network of claim 7, wherein multiple conduits between gateways are associated with each externally connected component and wherein the server is adapted for selecting any of the plurality of conduits for transmitting information between the first and the second gateways to selected components.

9. The wiring network of claim 8, wherein the selection of conduits is based on a predetermined hierarchy.

10. The wiring network of claim 9, wherein the hierarchy is adapted for selecting the conduit of least resistance.

11. The wiring network of claim 9, wherein the hierarchy is adapted for selecting the shortest conduit between selected components and related gateways.

12. The wiring network of claim 7, further including a conduit selector on each gateway.

13. The wiring network of claim 1, wherein said structure comprises a vehicle having a central control center and a plurality of components located remotely from the central control center and controlled from the central control center, and wherein at least one gateway is accessible by the control center and at least another gateway is accessible by each of the remote components.

14. The wiring network of claim 13, wherein the vehicle comprises an aircraft having a cockpit, the means for controlling selecting being located in the cockpit and connected to the first gateway and a remote component being located outside the cockpit and connected to the second gateway.

15. A wiring system for an aircraft comprising an outer structure having
a composite fabrication assembly made of a plurality of layers of composite materials for connecting components outside of the structure for sending and receiving transmittable information between the components, the wiring system comprising:
a plurality of nonwoven conductive conduits placed between layers of the assembly, each having opposite ends;
first and second gateway means connected to opposite ends of each of the conduits for selecting one of the conduits for communication between the gateway means; and
means for controlling selecting one of the conduits from the plurality of nonwoven conductive conduits responsive to damage to a previously selected one of the plurality of nonwoven conductive conduits to select and direct the transmittable information over the selected conduit to thereby provide continued communication between the first and the second gateway.

16. The wiring system of claim 15, wherein the aircraft includes a cockpit, wherein the wiring system further includes a controller located in the cockpit and connected to the first gateway means, and wherein one of the components is located outside of the cockpit and connected to the second gateway means.

17. The wiring system of claim 15, wherein said means for controlling selecting includes a computer, and wherein the layers of composite materials are separate fabric layers made of woven, high-strength fibers, impregnated with resin.

18. A wiring system for an aircraft comprising an outer structure having a composite fabrication assembly made of a plurality of layers of composite materials for connecting components adjacent the structure for sending and receiving transmittable information between the components, the wiring system comprising:
a plurality of nonwoven conductive conduits placed between layers of the assembly, each having opposite ends;
a first and a second gateway connected to opposite ends of each of the conduits and positioned to select one of the conduits for communication between the gateways; and
a server electrically or optically connected to at least one of the gateways and positioned to instruct the at least one of the gateways to select one of the conduits from the plurality of nonwoven conductive conduits to carry transmittable information over the selected conduit.

19. The wiring system of claim 18, wherein the one of the conduits is a first conduit, wherein the at least one of the gateways is a first and a second gateway, and wherein the server determines the condition and usage of each of the plurality of conduits between the first and second gateways and instructs the gateways to select a second conduit when the server determines the first conduit to be unusable.

20. The wiring system of claim 19, wherein the aircraft includes a cockpit, wherein the wiring system further includes a cockpit controller located in the cockpit and connected to the first gateway, wherein one of the components is located outside of the cockpit and connected to the second gateway, wherein the layers of composite materials are separate fabric layers made of woven, high-strength fibers, impregnated with resin, wherein the plurality of nonwoven conductive conduits is positioned between first and second fabric layers.

* * * * *